INVENTOR
EUGENE RICHARDSON

BY Barthel & Bugbee

ATTORNEYS

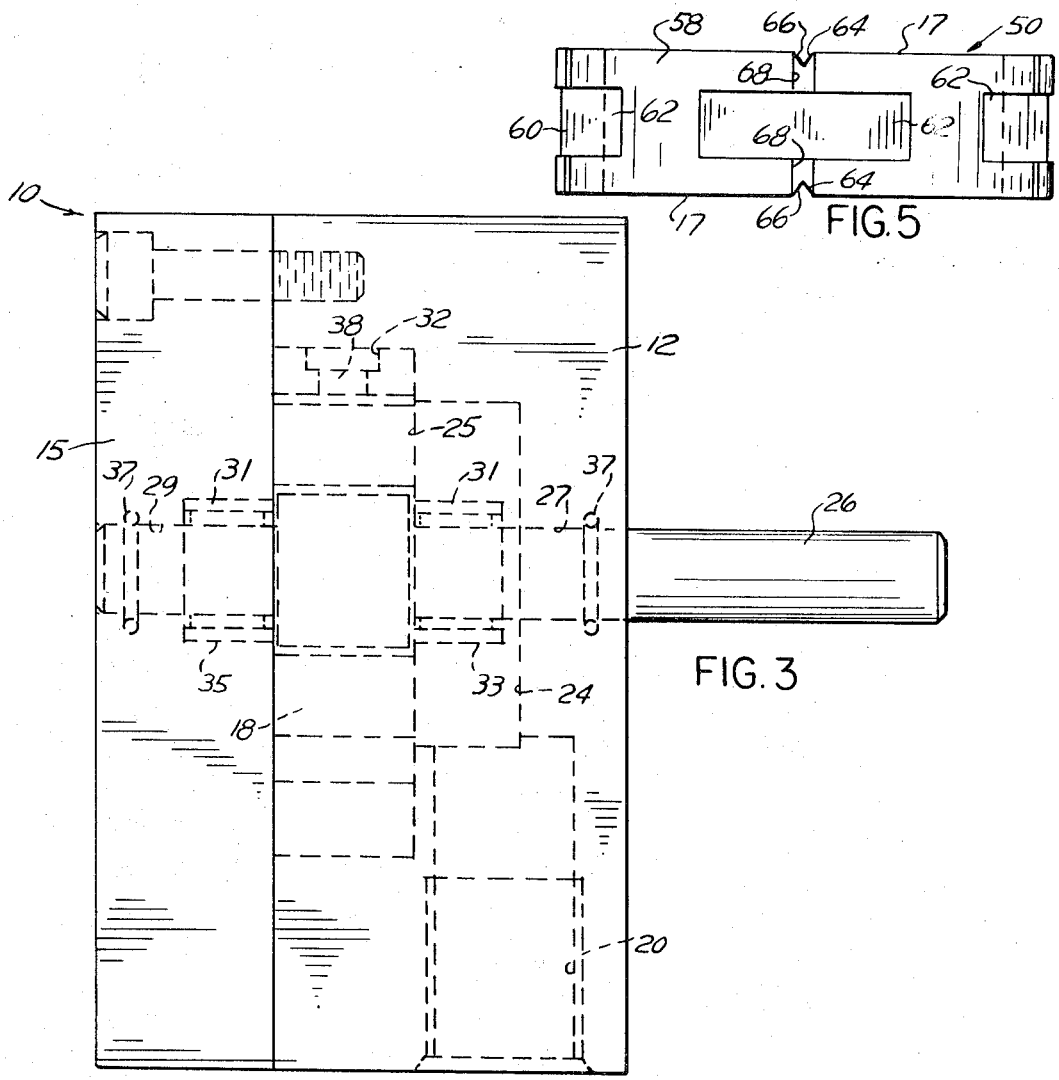
FIG. 5
FIG. 3
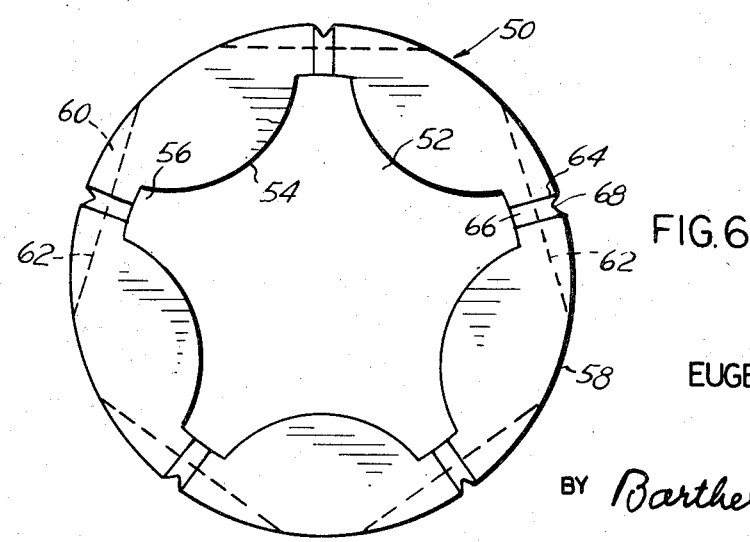
FIG. 6
INVENTOR
EUGENE RICHARDSON
BY Barthel & Bugbee
ATTORNEYS United States Patent Office 3,563,679
Patented Feb. 16, 1971

3,563,679
PRESSURE-COMPENSATED GEAR-ROTOR HYDRAULIC MOTOR OR PUMP
Eugene Richardson, Southfield, Mich., assignor to Lamina, Inc., Oak Park, Mich., a corporation of Michigan
Filed Jan. 9, 1969, Ser. No. 790,086
Int. Cl. F01c 1/10; F04c 1/06
U.S. Cl. 418—72                     8 Claims

ABSTRACT OF THE DISCLOSURE

Rotatably mounted in a cylindrical rotor bore in a housing block containinf fluid inlet and outlet ports is an annular outer internal-gear-rotor containing an approximately star-shaped opeing having inwardly-projecting teeth or lobes separated from one another by truncated V-shaped recesses. Rotatably mounted within this star-shaped opening of the outer gear rotor is an inner external-gear rotor having outwardly-projecting teeth or lobes meshing snugly with the recesses between the teeth of the outer internal gear rotor. The inner rotor is mounted on a rotary shaft having its axis disposed eccentric to the axis of rotation of the outer rotor, and is provided with one less tooth or lobe than the outer rotor. Segmental circumferentially-spaced pockets are formed in the periphery of the outer rotor and are connetced by fluid passageways to the recesses between the internal teeth of the outer rotor. A portion of the pressure fluid developed, during operation, between the internal and external teeth of the two rotors passes through these passageways into the peripheral pockets of the outer rotor, thereby applying a standing external pressure against the periphery of the outer rotor. This standing external pressure counterbalances the internal pressure against the annular outer rotor and consequently prevents the expansion and binding thereof against the side wall of the rotor bore, as occurs in conventional gear rotor motors or pumps operated at high speeds and pressures.

BACKGROUND OF THE INVENTION

The gear rotor hydraulic motor or pump has long been known and widely manufactured and sold in the hydraulic pump and motor industry under the trade name "Gerotor." By driving its shaft from a prime mover, such as an electric motor, it may be used as a pump, but by supplying pressure fluid to it, it operates equally well as a motor. The conventional Gerotor consists of an outer housing block containing a cylindrical bore with inlet and outlet ports and a central eccentric shaft to which is keyed an inner star-shaped rotor. This rotates in the star-shaped chamber of an annular outer rotor, this chamber having one or more recess than the inner rotor has lobes. The assembly of the inner and outer rotors rotates within the cylindrical bore. A cover plate closes the cylindrical bore. The original patent on this twin rotor combination was issued to Myron F. Hill on Aug. 28, 1928 under No. 1,682,563 which in turn was a division of an earlier application. This gear rotor is widely used as a power steering motor for automobiles and tractors.

When run as a motor, however, this conventional gear rotor motor is limited in speed and correspondingly limited in the pressure of fluid which it will accommodate in order to achieve its maximum speed by the fact that above a certain maximum pressure, the pressure in the star-shaped chamber of the outer rotor causes the outer rotor to expand outward like an internal band brake in an automobile and to bind and "freeze" against the side wall of the cylindrical bore in the housing block. This defect has considerably limited its use but has been overcome by the present invention.

Figure 1:
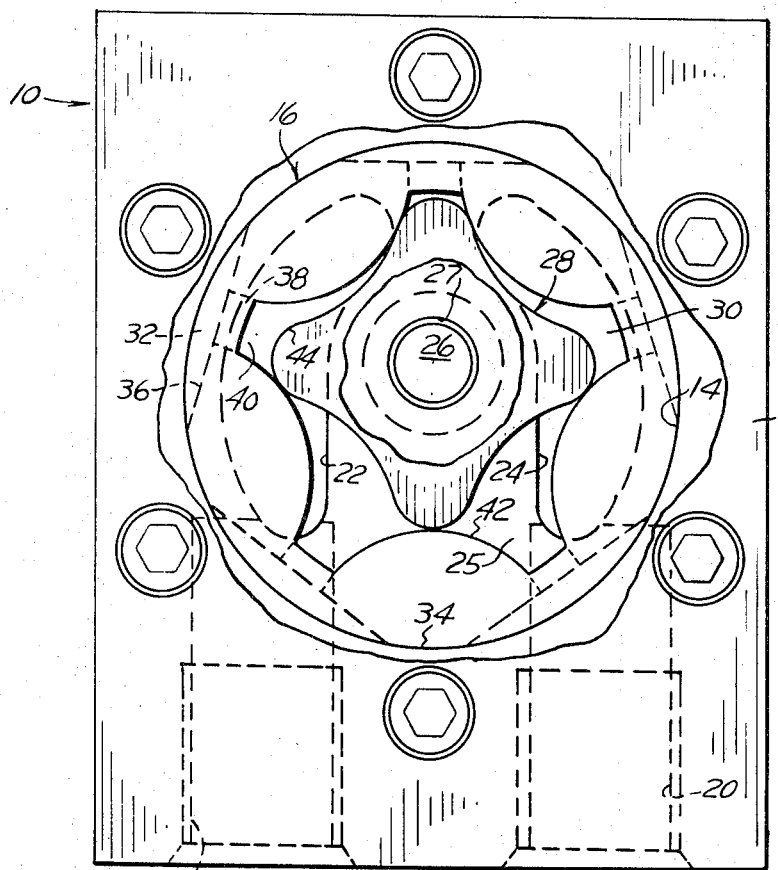
Figure 4:
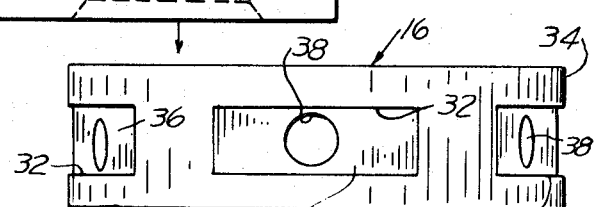
Figure 2:
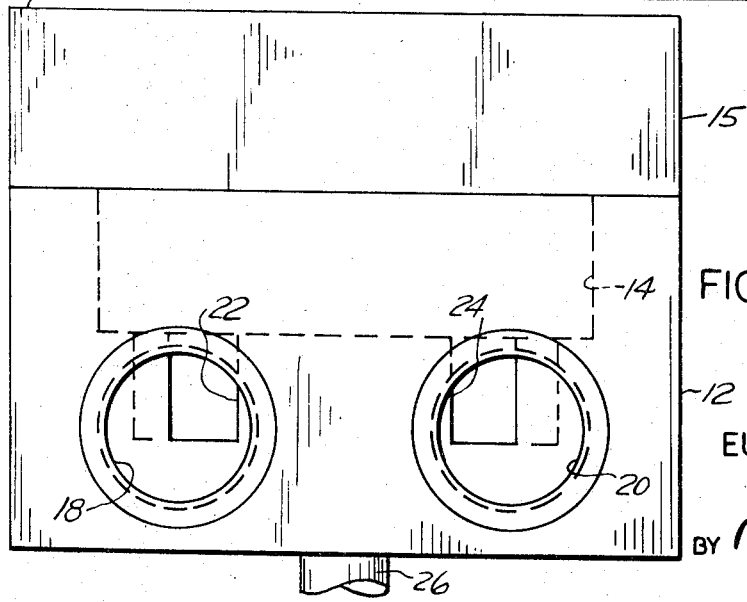

In the drawings:
FIG. 1 is a top plan view of the pressure-compensated gear-rotor hydraulic motor or pump, according to one form of the invention, with the top plate broken away to disclose the internal construction;
FIG. 2 is a front elevation of the motor shown in FIG. 1;
FIG. 3 is a right-hand side elevation of the motor shown in FIGS. 1 and 2;
FIG. 4 is a side elevation of the outer rotor of FIGS. 1 to 3 inclusive, removed from the motor;
FIG. 5 is a side elevation of a modified outer rotor for use in the motor of FIGS. 1 to 3 inclusive; and
FIG. 6 is a top plan view of the outer rotor shown in FIG. 5.

Referring to the drawings in detail, FIGS. 1 to 4 inclusive show a pressure-compensated gear-rotor hydraulic motor or pump, generally designated 10, according to one form of the invention as consisting of a housing block 12 containing a cylindrical rotor bore 14 closed by an end plate or cover plate 15. Rotatably mounted in the rotor bore 14 is an annular internally-toothed outer gear rotor 16 having parallel faces 17. Access to the rotor bore 14 is given by fluid inlet and outlet passageways 18 and 20 leading respectively to kidney-shaped inlet and outlet ports 22 and 24 in the bottom wall 25 of the rotor bore 14.

Rotatably mounted in a shaft bore 27 disposed eccentrically to the axis of the rotor bore 14 in the housing block 12 and in a coaxial shaft bore 29 in the cover plate 15 is a shaft 26 to which is keyed or otherwise drivingly secured a four-lobed or four-toothed approximately star-shaped gear rotor or inner rotor 28 which in turn meshes snugly with and is rotatable within the five-toothed approximately star-shaped opening 30 in the annular outer rotor 16. The outer rotor 16 is snugly but rotatably mounted in the cylindrical rotor bore 14, whereas the shaft 26 is journaled in anti-friction bearings 31 mounted in counterbores 33 and 35 respectively in the housing block 12 and cover plate 13, and sealed against leakage by O-rings 37 (FIG. 3).

Formed in the periphery of the annular outer rotor 16 are circumferentially-spaced fluid pressure pockets or cavities 32 extending inward from the otherwise cylindrical peripheral surface 34 thereof. The pockets 32 have rear surfaces 36 which are conveniently disposed along chords of the cylindrical peripheral surface 34 by machining operations. These peripheral pockets 32 receive pressure fluid from the star-shaped opening 30 within the annular outer rotor 16 by way of passageways 38 leading therethrough from the approximately truncated V-shaped recesses 40 lying between adjacent inwardly-projecting arcuate lobes or internal teeth 42 of the outer rotor 16.

The inner rotor 28 is provided with convex external lobes or teeth 44 which are one less in number than the outer rotor lobes or teeth 42 and also one less than the recesses 40 with which the inner rotor teeth 44 are constantly in meshing engagement. These inner rotor teeth 44 are sepaarted from one another by arcuate concave surfaces which are of approximately the same curvature as the outer rotor teeth 42 so as to roll and slide thereover during relative rotation between the outer and inner gear rotors 16 and 28 respectively.

The modified outer rotor, generally designated 50, shown in FIGS. 5 and 6 is of generally similar construction to the previously-described outer rotor 16 of FIGS. 1 to 4 inclusive, in that it has a similar five-toothed approximately star-shaped working chamber 52 containing five inwardly-convex lobes 54 separated from one another by approximately truncated V-shaped recesses 56. As before, the outer rotor 50 is provided with a cylindrical peripheral surface 58 containing peripherally-spaced pockets 60 formed by tangential or chordal machining along chordal rear surfaces 62. These peripheral pockets receive pressure fluid from the truncated V-shaped recesses 56 of the star-shaped working chamber 52 by way of L-shaped grooves 64 composed of radial portions 66 communicating with axial portions 68 opening into the pockets 60.

In the operation of either form of the invention as a motor, employing either the outer rotor 16 of FIGS. 1 to 4 inclusive or 50 of FIGS. 5 and 6, the supplying of pressure fluid through the inlet passageway 18 from a suitable hydraulic pump (not shown) causes this pressure fluid to flow through the inlet port 22 into the star-shaped working chamber 30 or 52 where it acts against the lobes 44 of the inner rotor 28, causing it and its eccentric shaft 26 to rotate. As the inner rotor 28 rotates, the hydraulic fluid pushed ahead of the lobes 44 is discharged through the outlet port 24 and outlet passageway 20 back to the hydraulic pump or reservoir thereof.

Meanwhile, pressure fluid also flows radially outward from the working chamber 30 or 52 within the outer rotor 16 or 50 into the peripheral pockets 32 or 60 by way of the passageways 38 or 64, setting up a counter-pressure within the pockets 32 or 60. This counterpressure acts against the peripheral surface 34 or 58 of the outer rotor 16 or 50 respectively, counteracting the tendency thereof to expand outward in response to the pressure in the working chamber 30 or 52 and thus providing for free rotation of the outer roller 16 or 50 within its chamber bore 14.

In either form of the invention (FIGS. 1 or 6) expansion and therefore binding of the outer surface 34 or 58 of the outer rotor 16 or 50 against the chamber bore 14 is counteracted and therefore prevented by the static pressure of fluid reaching the pockets 32 or 60. This static pressure in the pockets 32 or 60 applies force radially inward upon the peripheral surface 34 or 58 of the outer rotor 16 or 50 to counterbalance the outward pressure of the fluid in the rotor chamber 30 or 52. This motor has been completely successful. Whereas previous conventional motors of this type would bind at speeds above 4000 r.p.m., the present motor was run for two weeks at 12,000 r.p.m. without any evidence of binding and without any appreciable wear.

I claim:
1. A pressure-compensated gear-rotor hydraulic motor or pump, comprising
   a housing containing a continuous cylindrical rotor bore with fluid inlet and outlet ports communicating therewith and also containing a shaft bore with its axis disposed parallel and eccentric to said rotor bore and opening into said rotor bore,
   an annular outer gear rotor rotatably mounted in said rotor bore in snugly mating relationship therewith and having a plurality of circumferentially-spaced pockets in the outer periphery thereof extending inwardly therefrom and also having a plurality of circumferentially-spaced inwardly-projecting internal teeth on the inner periphery thereof with recesses therebetween and also having fluid passageways connecting said recesses to said pockets,
   a rotary shaft rotatably mounted in said shaft bore,
   and an externally-toothed inner gear rotor drivingly connected to said shaft in snugly intermeshing relationship with said internally-toothed outer rotor.

2. A pressure-compensated gear-rotor hydraulic motor or pump, according to claim 1, wherein said pockets have rear surfaces disposed approximately along chords of said annular outer rotor.

3. A pressure-compensated gear-rotor hydraulic motor or pump, according to claim 2, wherein said passageways extend from said recesses through said rear surfaces into said pockets.

4. A pressure-compensated gear-rotor hydraulic motor or pump, according to claim 1, wherein said pockets are elongated in a circumferential direction.

5. A pressure-compensated gear-rotor hydraulic motor or pump, according to claim 1, wherein said pockets have rear surfaces extending between arcuately-spaced ends thereof.

6. A pressure-compensated gear-rotor hydraulic motor or pump, according to claim 1, wherein said passageways comprise grooves in at least one face of said annular outer rotor extending from the interior thereof outwardly to said pockets.

7. A pressure-compensated gear-rotor hydraulic motor or pump, according to claim 6, wherein said grooves are approximately L-shaped.

8. A pressure-compensated gear-rotor hydraulic motor or pump, according to claim 1, wherein said passageways comprise grooves in both faces of said annular outer rotor extending from the interior thereof outward to spaced locations in said pockets.

References Cited

UNITED STATES PATENTS

| | | | |
|---|---|---|---|
| 2,956,506 | 10/1960 | Brundage | 103—126A |
| 3,034,446 | 5/1962 | Brundage | 103—126A |
| 3,139,835 | 7/1964 | Wilkinson | 103—126A |
| 3,416,460 | 12/1968 | Eickmann | 103—126A |
| 3,427,983 | 2/1969 | Brundage | 103—126A |

MARTIN P. SCHWADRON, Primary Examiner

I. C. COHEN, Assistant Examiner

U.S. Cl. X.R.

418—166